United States Patent [19]
La Marre et al.

[11] 3,868,726
[45] Mar. 4, 1975

[54] WELDING HELMET

[75] Inventors: David A. La Marre; Donald A. Smith, both of Woodstock; Herbert F. Stickney, North Woodstock, all of Conn.

[73] Assignee: American Optical Corporation, Southbridge, Mass.

[22] Filed: Mar. 4, 1971

[21] Appl. No.: 121,054

[52] U.S. Cl. .................................................. 2/8
[51] Int. Cl. ........................................... F16p 1/06
[58] Field of Search ........................ 2/8, 11, 9, 10

[56] References Cited
UNITED STATES PATENTS
| | | | |
|---|---|---|---|
| 1,342,897 | 6/1920 | De Rosier | 2/8 |
| 2,576,698 | 11/1951 | Russum | 2/8 UX |
| 3,231,896 | 2/1966 | Henderson | 2/8 |

FOREIGN PATENTS OR APPLICATIONS
822,714  9/1937  France ........................................ 2/8

Primary Examiner—Werner H. Schroeder
Attorney, Agent, or Firm—William C. Nealon, Noble S. Williams; Robert J. Bird

[57] ABSTRACT

A welding helmet having a detachable and readily replaceable facepiece covering of radiant energy reflective material, the major portion of which is normally spaced away from the facepiece for ventilation of the helmet during its use. A thermally insulating material may be placed between the facepiece and helmet and/or the helmet may be formed of thermally insulating material.

8 Claims, 7 Drawing Figures

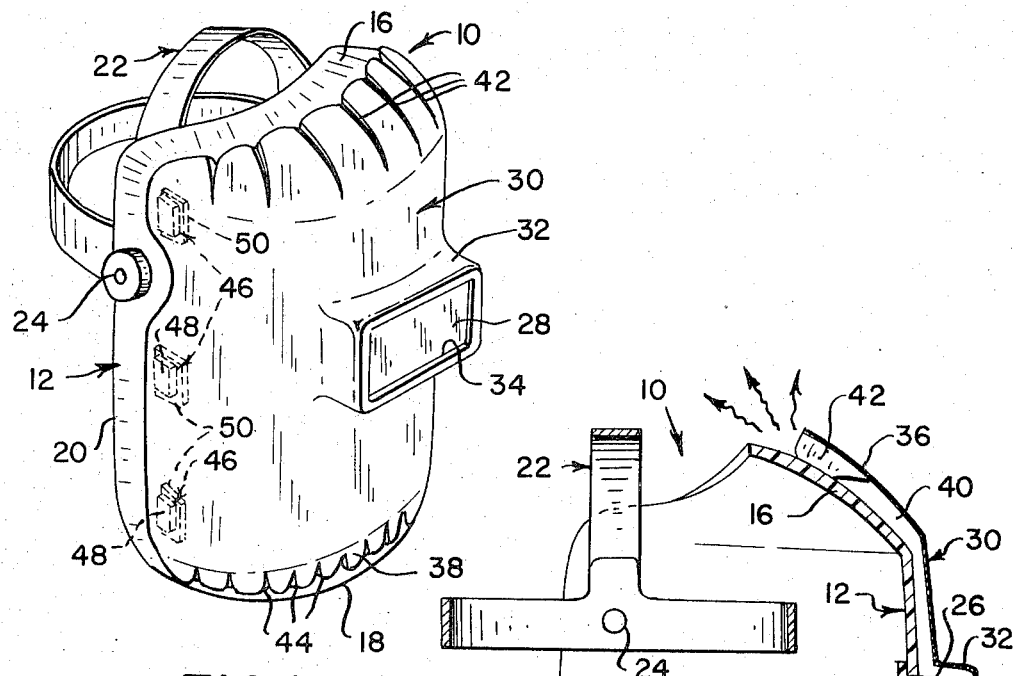
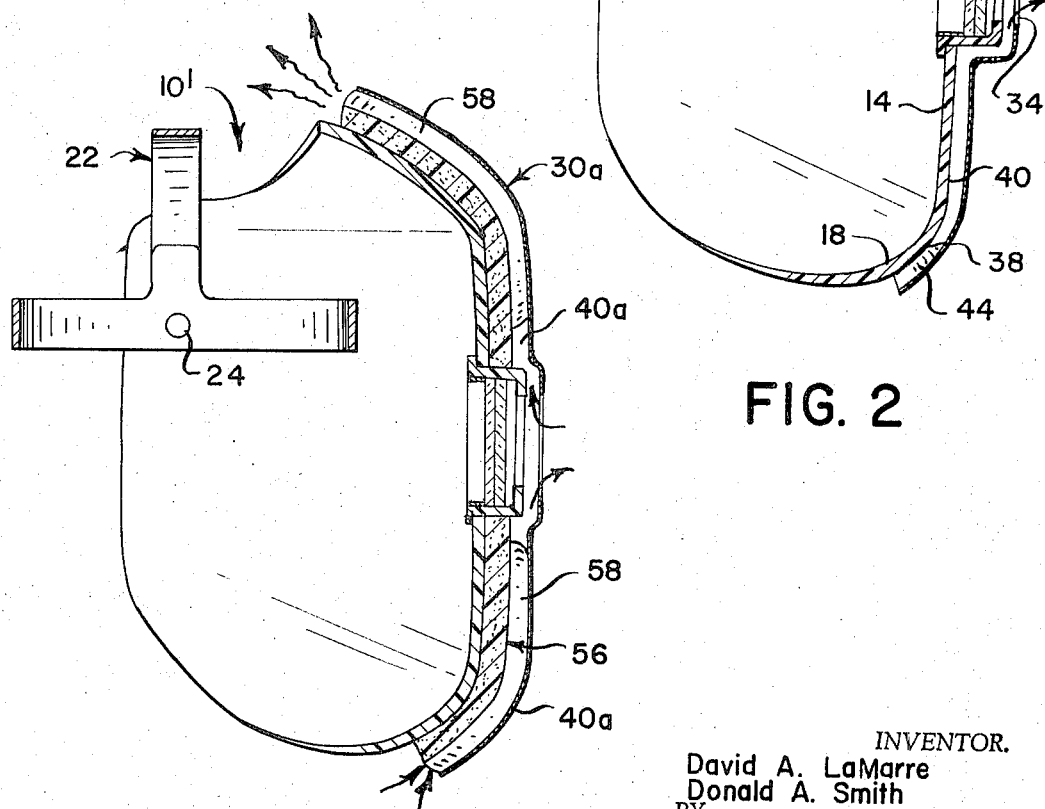

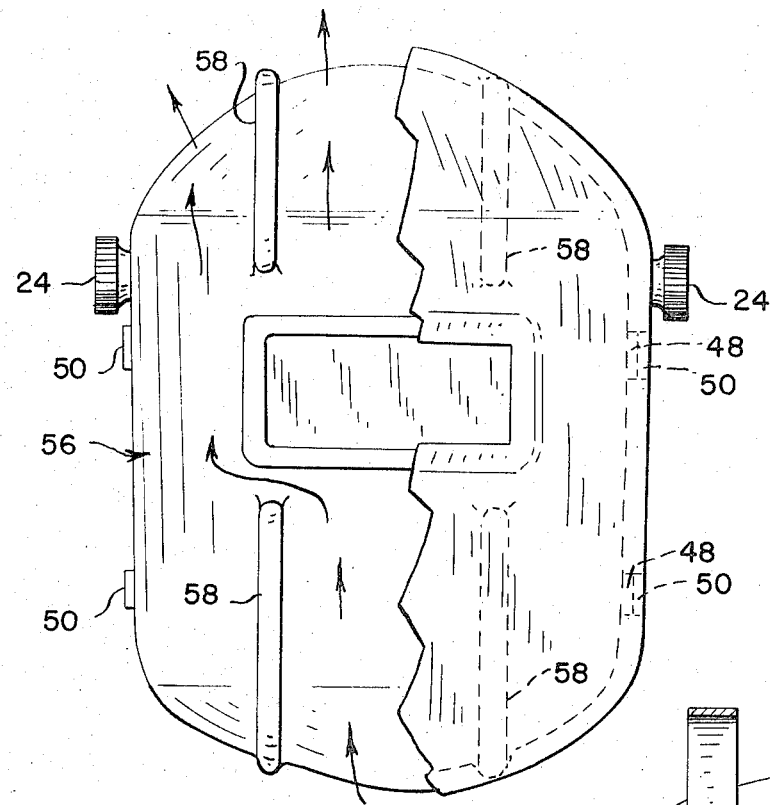
FIG. 4
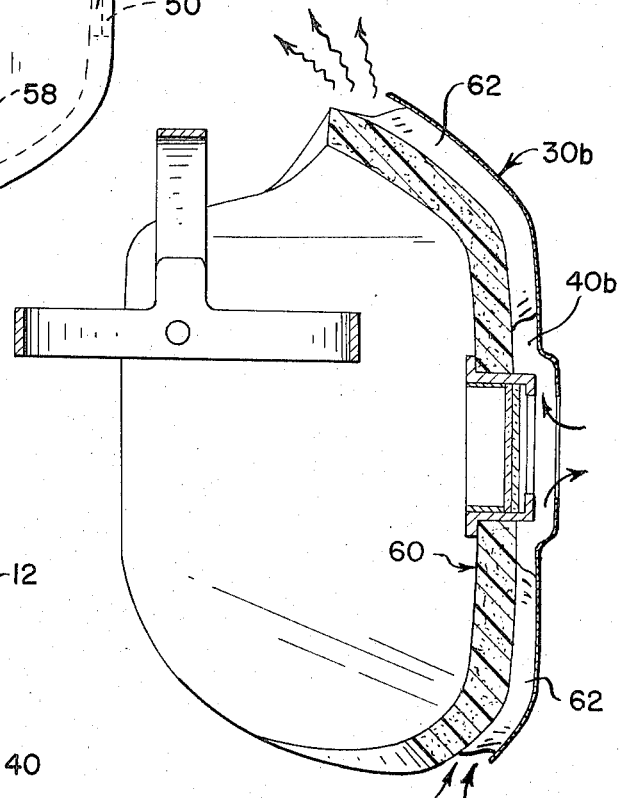
FIG. 5
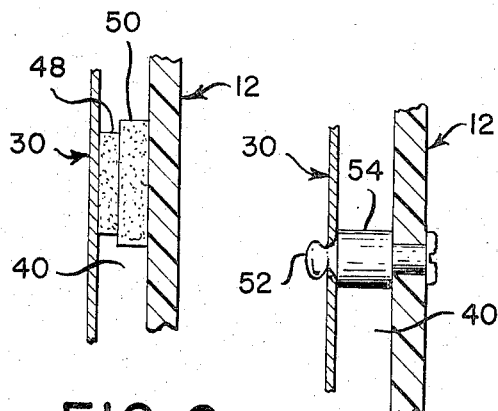
FIG. 6
FIG. 7

WELDING HELMET

BACKGROUND OF THE INVENTION

1. Field of the Invention

Welding helmets with particular reference to improvements in their facepieces.

2. Description of the Prior Art

Welding helmets currently in use were developed for the protection of welders in the earlier days of 100 to 150 ampere operating ranges using separate welding rods with frequent interruptions in welding operations for the replacement of spent rods.

Presently, however, welding equipment may operate with up to 600 amperes current which is partially dissipated as emitted radiant energy. Also, the welder's luxury of frequently stopping work to change welding rods and cool himself has been taken away by the now common continuous wire welding technique.

With the theory of welder's protection heretofore having been primarily related to shielding and giving little consideration to insultation, the widely accepted choice for welder's facepieces has been a thin but rigid and strong fiberglas or fiber-filled plastic sheet material. For the most part, these facepieces have also been of dark colors which absorb substantial amounts of radiant energy and quickly become uncomfortably hot. Those which are supplied in lighter colors, including white, are quickly soiled by dirt, dust and welding spatter and soon become equally as absorbent to radiant energy and uncomforable to wear.

In addition to the usual shielding of the welder (the theory of prior art protection), the present invention deals with heat rejection and the lessening of heat transfer through welding helmets without appreciably increasing their weight and/or size.

SUMMARY OF THE INVENTION

In essence, the present invention insulates the welder's face from excessive exposure to welding heat by providing welding helmet facepieces with highly radiation-reflective coverings which are inexpensively disposable and replaceable upon soiling. The coverings are spaced from the facepieces an amount sufficient for cooling of the facepieces by convection or other passage of air in the spacings between corresponding coverings and facepieces. Also contemplated are the addition of heat-insulating barriers placed intermediately of the facepieces and their coverings and/or the incorporation of heat-insulating materials of high mechanical strength as main body materials of the facepieces.

Details of the present invention will become apparent from the following description when taken in conjunction with the accompanying drawing.

In the Drawing

FIG. 1 illustrates, in perspective, a preferred embodiment of the invention;

FIG. 2 is a longitudinal cross-sectional view of the welding mask shown in FIG. 1;

FIG. 3 is a longitudinal cross-sectional view of a modification of the invention;

FIG. 4 is a front elevational view of the embodiment of the invention shown in FIG. 3 with a portion of its forward structure broken away for the convenience of more clearly depicting underlying structure;

FIG. 5 is a vertical cross-sectional view of still another embodiment of the invention; and FIGS. 6 and 7 are fragmentary cross-sectional views of fastening devices which are exemplary of types applicable to the illustrated embodiments of the invention.

Description of the Preferred Embodiments

Referring more particularly to FIGS. 1 and 2 which illustrate one embodiment of the invention, welding helmet 10 comprises the usual facepiece 12 formed of a hard and durable fireproof plastic, fiberglass or fiber-reinforced sheet material. Facepiece 12 is molded, pressed from sheet stock or otherwise formed, usually as a unitary structure, so as to have a generally cylindrical front section 14 (FIG. 2) for protecting the eyes and front of the face, a crown section 16 for protection of the forehead, a depending skirt section 18 for protection of the chin and neck and rearwardly directed sides 20 for side-of-the-head protection.

Facepiece 12 is mounted on harness 22 which, when supported on the top of a wearer's head, positions the mask for swinging movement about pivots 24 upwardly away from and downwardly toward the face. Front section 14 of facepiece 12 is apertured and provided with a window frame 26 having window 28 therein through which a welder can view his work. As it is customary, window 28 comprises a light-filtering glass or the equivalent which filters light from a welding arc in such a manner that injurious rays emitted from the arc are not permitted to damage the welder's eyes.

When mask 10 is in a position of use, the rearwardly directed edges of crown section 16, skirt section 18 and sides 20 are in such proximity to the head as to prevent dangerous light from entering between the mask and head to the extent of reaching the eyes. This also provides the usual adequate protection from spattering hot metal or sparks.

To the extent of the construction thus far described, helmet 10 is generally conventional and, according to the prior art theory of protection, it would afford the usual shielding against spattering, sparks and visually harmful radiation but, as it is also usual in such cases, its insulation against present day high emissions of welding heat is inadequate for reasonable comfort especially during prolonged welding operations. This is the result of facepiece 12 being relatively thin, non-porous and not readily reflective to radiation because of its being dark in color or quickly rendered so by dirt and spatter accumulation.

Improvements according to the present invention are as follows:

Detachably connected to facepiece 12 is disposable covering 30 of light-weight sheet material, e.g., aluminum foil, which is highly reflective to radiant energy. Other substances such as fiber reinforced or metallized non-combustible plastics may also be used. These materials may be smooth-surfaced for specular reflection or have a waffle-like or otherwise uneven surface texture for diffusely reflecting radiation received thereby. Covering 30 is pressed or otherwise formed into a shape conforming substantially to that of facepiece 12 with a forwardly directed section 32 thereof adapted to extend over window frame 26 and having opening 34 which exposes the window 28 of facepiece 12.

Being of a size and contour shape such that it will cover all or at least the major portion of facepiece 12, as shown, covering 30 has crown and skirt sections 36 and 38 respectively which are adapted to extend over correspondingly shaped sections 16 and 18 of the facepiece. An air space 40 (see FIG. 2) is established between covering 30 and facepiece 12 by folds or crimps 42 and 44 formed in the crown and skirt sections 36 and 38 respectively. Crimps 42 and 44 are preferably V-shaped or otherwise so formed as to each make substantially only line contact with facepiece 12 when the covering 30 is fitted thereagainst. Thus, with a minimum of contact being made by covering 30 against facepiece 12, a series of juxtaposed vertically extending open channels 45 are formed through each of the crown and skirts sections 36 and 38. These channels permit the circulation of air upwardly along the front surface of facepiece 12 and the rear surface of covering 30 thereby cooling these surfaces. Air moving in the direction of the arrows shown in FIG. 2 may be caused to do so in part by convection as a result of the source of welding heat usually being below the head of the welder and also in part due to an imposed pumping action resulting from up and down movements of the welder's head and/or tilting of the mask about pivots intermittently of actual welding operations. In addition to such cooling of the welding helmet by the passage of air through space 40, the well known heat insulating effect of a dead air space during occurences of air stagnation in space 40 continuously protects the wearer from the major portion of welding heat radiation. Thus, by direct reflection of radiation from covering 30 and the aforesaid cooling of the covering and facepiece 12, maximum protection of a wearer of helmet 10 is accomplished according to principles of the invention.

In order to assure maximum rejection of welding radiation by reflection from covering 30 at all times, quick replacement of a soiled covering is facilitated by readily releasable attachment devices 46 (FIG. 1). These devices may, for example, comprise mating pads 48 and 50 (FIG. 6) of a well known commercially available plastic hook and loop fastening material which when pressed together becomes fastened but may be readily stripped apart. Pads 48 are cemented to covering 30 and pads 50 are cemented to facepiece 12. When secured together, they also assist in maintaining the air space 40 open throughout the expanse of covering 30. It should be understood, however, that in cases where the intermediate portion of covering 30 may be subject to striking forces causing its indenture, this portion of the covering may be provided with reinforcing ribs similar to crimps 42 and 44, preferably running vertically. Thus, undue collapse or closing of air space 40 may be avoided.

An alternative to the aforementioned type of attachment devices may be the incorporation of the collar button type of fasteners, preferably non-metallic, one form of which is shown in FIG. 7 as having button 52 and an enlarged shank 54 functioning to space the covering 30 from facepiece 12. Other obvious forms of grippers or snap fasteners may replace the illustrated collar button 52 on shank 54 and/or any and all parts of either of the illustrated attachment devices.

With reference to the embodiment of the invention illustrated in FIGS. 3 and 4, it can be seen that protection against extreme amounts of heat from welding operations may be accomplished by interposing between a disposable covering 30a and the same type of facepiece 12' of a mask 10' a thickness of heat-insulating material, e.g., thermoplastic or thermosetting foam. This latter insulation, preferably being applied directly to facepiece 12' may comprise a molded shell 56 of the aforementioned polystyrene foam material which is cemented, stapled or otherwise secured with non-metallic fastening means to facepiece 12'. A preferred embodiment of this shell 56 can best be seen in FIG. 4 as having integrally formed forwardly protruding ribs 58 against which covering 30a is fitted. In this manner of spacing covering 30a away from the main body portion of shell 56, an air passage 40a (FIG. 3) substantially corresponding in shape, size and function to that of air space 40, already described, is provided between covering 30a and shell 56. The cooling or insulating effect of moving air and/or intermittently stagnant air in space 40a is, in this case, backed up by the additional insulation of shell 56 for added protection against welding heat. Covering 30a is preferably detachably connected to shell 56 by suitable attachment devices, examples of which are shown in FIGS. 6 and 7, already described. Covering 30a is, accordingly, intended for frequent removal, disposal and replacement as soiling thereof occurs.

A still further modification of the invention is contemplated wherein, as shown in FIG. 5, the shell 58 and facepiece 12' combination of FIGS. 3 and 4 are replaced by a single facepiece unit 60. Unit 60 is preferably formed, e.g., by molding or casting, of a heat-insulating material having high mechanical strength such as a polyurethane foam.

Unit 60 is preferably provided with integral forwardly extending ridges 62 similar to and having the same function as ridges 58 of the FIG. 3 embodiment. In this respect, a disposable highly radiation-reflective covering 30b is placed against ridges 62 with air space 40b thus established for insulating the front surface of facepiece 60.

We claim:
1. A welding helmet comprising:
   an opaque facepiece having a window;
   means for supporting the facepiece upon the head when the helmet is worn;
   a thin disposable covering of opaque, highly radiation-reflective sheet material extending over the major portion of the forward side of said facepiece around said window, said covering being spaced away from said facepiece and cooperating with said facepiece throughout at least a substantial portion of its extent thereover to form channel means adapted to permit circulation of environmental air between said facepiece and covering; and
   means for detachably connecting said covering to said forward side of said facepiece.

2. A welding helmet according to claim 1 wherein said facepiece is formed of a substantial thickness of porous, rigid heat-insulating material of relatively high strength.

3. A welding helmet comprising:
   a facepiece having a window;
   means for supporting the facepiece upon the head when the helmet is worn;
   a disposable covering of thin, highly radiation-reflective sheet material overlying the major portion of the forward side of said facepiece around said window in spaced relationship from said facepiece throughout the major portion of its extension thereover, portions of said disposable covering being crimped inwardly toward said facepiece for maintaining said spaced relationship of said covering therewith; and means for detachably connecting said covering to said forward side of said facepiece.

4. A welding helmet comprising:

a facepiece having a window;

means for supporting the facepiece upon the head when the helmet is worn;

a disposable covering of thin, highly radiation-reflective sheet material overlying the major portion of the forward side of said facepiece around said window, said disposable covering being spaced from said facepiece throughout the major portion of its extension thereover and said facepiece including a number of forwardly directed relatively long and thin ribs against which said covering is positioned for establishing and maintaining said spaced relationship of said covering with said facepiece; and means for detachably connecting said covering to said forward side of said facepiece.

5. A welding helmet according to claim 4 wherein said ribs are each an integral part of said facepiece.

6. A welding helmet comprising:

a facepiece having a window;

means for supporting the facepiece upon the head when the helmet is worn;

a disposable covering of thin, highly radiation-reflective sheet material overlying the major portion of the forward side of said facepiece around said window, said disposable covering being spaced from said facepiece throughout the major portion of its extension thereover and a thickness of heat-insulating material in said space between said covering and facepiece; and means for detachably connecting said covering to said forward side of said facepiece.

7. A welding helmet according to claim 6 wherein said thickness of heat-insulating material comprises a shell affixed to said facepiece and said shell has a number of relatively long and thin forwardly extending ribs against which said covering of thin highly radiation-reflective material is supported in spaced relationship with said shell.

8. A welding helmet according to claim 5 wherein said facepiece is formed of a substantial thickness of porous, rigid heat-insulating material of relatively high strength.

* * * * *